United States Patent [19]

Manigault

[11] 3,948,670

[45] Apr. 6, 1976

[54] ALUMINA-CHROME REFRACTORY

[75] Inventor: Edward L. Manigault, Cincinnati, Ohio

[73] Assignee: NL Industries, Inc., New York, N.Y.

[22] Filed: Oct. 24, 1974

[21] Appl. No.: 517,473

[52] U.S. Cl. .................. 106/57; 106/66; 106/67
[51] Int. Cl.² .................. C04B 35/10; C04B 35/48
[58] Field of Search .................. 106/57, 66, 67

[56] References Cited
UNITED STATES PATENTS

| | | | |
|---|---|---|---|
| 3,192,058 | 6/1965 | Davies et al. | 106/66 |
| 3,378,385 | 4/1968 | McCreight et al. | 106/66 |
| 3,615,775 | 10/1971 | Teeter | 106/66 |

*Primary Examiner*—J. Poer

[57] ABSTRACT

An improved alumina-chrome refractory composition having increased strength at both ambient and high temperatures has been prepared comprising the following ingredients:

| | |
|---|---|
| Tabular Alumina | 70–96% |
| Calcined Alumina —325 mesh | 0–10% |
| Milled Zircon —325 mesh | 1–10% |
| Chromic Oxide Refractory Grains Ground to —10 mesh with at Least 70% +200 mesh | 3–10% |
| Bentonite | 0–4% |
| Water | 0–10% |
| Phosphate Compound | 0–18% |

9 Claims, No Drawings

ALUMINA-CHROME REFRACTORY

BACKGROUND OF THE INVENTION

An alumina-chrome refractory brick composition has been prepared by the prior art which contains the following composition:

| Tabular Alumina | 65–90% |
|---|---|
| Calcined Alumina | 0–10% |
| Chromic Oxide (−325 mesh) | 1–25% |

Such a product has been useful as refractory brick composition for use in the ferrous and non-ferrous industries. Although this prior art refractory product possesses high strength, it is desirable to produce a refractory composition which has a higher modulus of rupture at both ambient and high temperatures.

SUMMARY OF THE INVENTION

It has been discovered that the refractory composition of the prior art refractory product comprised of alumina and pigment grade chromic oxide (−325 mesh) may be improved considerably by employing chromic oxide refractory grains which are present in the fused or sintered form. This fused or sintered chromic oxide refractory grains should be ground to −10 mesh with at least 70% +200 mesh, as opposed to the prior art method which employs pigment grade chromic oxide which is 100% − 325 mesh size.

The refractory composition produced by the instant invention comprises the following:

| Tabular Alumina | 70–96% |
|---|---|
| Calcined Alumina | 0–10% |
| Milled Zircon | 1–10% |
| Chromic Oxide Refractory Grains Ground to −10 mesh with at Least 70% +200 mesh | 3–10% |
| Bentonite | 0–4% |
| Water | 0–10% |
| Phosphate Compound | 0–18% |

The mixture is then formed and fired at 350° to 1750°C. for 2 to 8 hours if desired.

If phosphates are not employed then the firing temperature should fall within the range from 1400° to 1750°C.

If a ramming or plastic mixture is to be produced, the mixture itself is used directly without forming and firing for the customers use. In the case of preparing a plastic mixture, from 1% to 4% bentonite is also added to the mixture.

DESCRIPTION OF THE PREFERRED EMBODIMENTS

In preparing the refractory composition of the instant invention it is important to have present in the mixture a variety of sizes of the various ingredients employed. Tabular alumina may be used as the only source of alumina, but it is preferred to have a mixture of tabular and calcined alumina.

The tabular alumina should be employed in various sizes. All of the −¼ inch +325 mesh alumina should be employed in the tabular form and in addition, with respect to the −325 mesh alumina, from ¼ to all of the −325 mesh alumina should be present in the tabular form. If calcined alumina is used, it should be −325 mesh in size. 65% to 95% of the alumina should be −¼ inch to +325 mesh in size, while the remainder of the alumina should be ground to −325 mesh.

The chromic oxide refractory grains should be ground to −10 mesh in size with at least 70% +200 mesh, and should be obtained from either previously fused or sintered chromic oxide.

It is preferred that zircon be employed in amounts from 1% to 10%, preferably from 3% to 7%. The size of the zircon should be −325 mesh.

In preparing the refractory composition of the instant invention, the alumina raw material, the ground refractory grains of chromic oxide, and the milled zircon are mixed together, and are formed into shapes which are then fired to form the desired refractory product. The mixture is fired at temperatures from 350°C. to 1750°C. for 2 to 8 hours to form the refractory composition. When phosphates are not employed the mixture should be fired at temperatures from 1400°C. to 1750°C.

The refractory composition of the instant invention possesses increased modules of rupture at both ambient and high temperatures. Although an increased modulus of rupture at ambient temperature is desirable, it is more preferable to have an increased modulus of rupture at high temperatures such as that mentioned above.

In order to describe the instant invention more fully, the following examples are presented:

EXAMPLE 1

The following ingredients were added to form a refractory mixture:

| Tabular Alumina | −8+65 mesh, Kg. | 44 |
|---|---|---|
| Tabular Alumina | −65+325 mesh, Kg. | 22 |
| Tabular Alumina | −325 mesh, Kg. | 19 |
| Calcined Alumina | −325 mesh, Kg. | 5 |
| Chromic Oxide Refractory Grains −10 mesh with at Least 70% +200 mesh Kg. | | 7 |
| Zircon | −325 mesh, Kg. | 3 |

The mixture was then tempered with lignin liquor and formed into bricks 9 in. × 4½ in. × 3 in. and the bricks were then fired at 1560°C. for 5 hours. After cooling to room temperature, the bricks were analyzed to determine their strengths which are listed as follows:

| Modulus of Rupture | |
|---|---|
| Ambient Temp. | High Temp. (1480°C.) |
| 8777 | 5122 |

EXAMPLES 2–3

The procedure of Example 1 was repeated except that various amounts of zircon were added to the mixture in Examples 2 and 3. Bricks having properties similar to those obtained in Example 1 were produced.

The operational details and the results obtained are recorded in Table I along with those of Example 1.

For comparison, a series of control runs were made with various compositions.

CONTROLS A-C

In these runs no chromic oxide was employed. Run A contained no zircon. Runs B and C contained zircon.

The results of these runs indicateed that modulus of rupture at both ambient temperature and at 1480°C. were unsatisfactory.

The results are recorded in Table II.

While this invention has been described and illustrated by the examples shown it is not intended to be strictly limited thereto, and other variations and modifications may be employed within the scope of the following claims.

TABLE I

| MATERIAL | MESH | EXAMPLES 1 | 2 | 3 | 4 | 5 |
|---|---|---|---|---|---|---|
| Tabular Alumina | Kg. −8+65 | 44 | 44 | 44 | 44 | 44 |
| Tabular Alumina | Kg. −65+325 | 22 | 22 | 22 | 22 | 22 |
| Tabular Alumina | Kg. −325 | 19 | 17 | 19 | 19 | 19 |
| Calcined Alumina | Kg. −325 | 5 | 3 | 5 | 5 | 5 |
| Milled Zircon | Kg. −325 | 3 | 7 | 3 | 3 | 3 |
| Aluminum Phosphate | Kg. | 0 | 0 | 0 | 5 | 0 |
| Phosphoric Acid | Kg. | 0 | 0 | 0 | 0 | 5 |
| Lignin Liquor | Kg. | 2.5 | 2.5 | 2.5 | 0 | 0 |
| Water | Kg. | 2 | 2 | 2 | 0 | 0 |
| Chromic Oxide Refractory Grains Sintered | −10 mesh with 80%+200 mesh | 7 | 7 | 0 | 7 | 7 |
| Chromic Oxide Refractory Grains Fused | −10 mesh with 88%+200 mesh | — | — | 7 | — | — |
| Chromic Oxide (Pigment Grade) | −325 | — | — | — | — | — |
| Silica | −325 | — | — | — | — | — |
| Modulus of Rupture, Ambient | | 8777 | 8668 | 8144 | 8767 | 7344 |
| Modulus of Rupture, 1480°C. | | 5122 | 5011 | 3349 | 5204 | 4925 |
| Porosity % | | 16.0 | — | 14.3 | 12.2 | 11.1 |
| Bulk Density g/cc | | 3.22 | — | 3.23 | 3.30 | 3.31 |

TABLE II

| MATERIAL | MESH | CONTROLS A | B | C | D | E | F |
|---|---|---|---|---|---|---|---|
| Tabular Alumina | −8+65 Kg. | 48 | 48 | 48 | 48 | 48 | 48 |
| Tabular Alumina | −65+325 Kg. | 24 | 24 | 24 | 24 | 24 | 24 |
| Tabular Alumina | −325 Kg. | 20 | 20 | 18 | 18 | 18 | 14 |
| Calcined Alumina | −325 Kg. | 8 | 5 | 3 | 3 | — | — |
| Milled Zircon | −325 Kg. | — | 3 | 7 | — | 3 | 7 |
| Lignin Liquor | | 2.5 | 2.5 | 2.5 | 2.5 | 2.5 | 2.5 |
| Water | | 2 | 2 | 2 | 2 | 2 | 2 |
| Chromic Oxide Refractory Grains Sintered | −10 mesh with 80%+200 mesh | — | — | — | — | — | — |
| Chromic Oxide Refractory Grains Fused | −10 mesh with 88%+200 mesh | — | — | — | — | — | — |
| Chromic Oxide (Pigment Grade) | −325 | — | — | — | 7 | 7 | 7 |
| Modulus of Rupture, Ambient | | 5395 | 6906 | 6085 | 7111 | 7070 | 7351 |
| Modulus of Rupture, 1480°C. | | 644 | 1835 | — | 2367 | 2658 | 2142 |

CONTROLS D-F

In these runs pigment grade chromic oxide was employed instead of coarse chromic oxide refractory grains and the results were inferior to those obtained in Examples 1–6.

The results are also recorded in Table II.

It has been discovered that the use of coarse chromic oxide refractory grains increases the bond strength at higher temperature over that retained when finely divided chromic oxide is employed.

EXAMPLES 4–5

In these examples aluminum phosphate was used in Example 4 while phosphoric acid was employed in Example 5. The results are also recorded in Table I.

It should be noted that the modulus of rupture results at both ambient and 1480°C. temperatures were high and in addition the porosities were reduced and the bulk densities were increased over those produced in Examples 1–3.

The phosphates when employed are added to develop a ceramic body which possesses high strength at reduced temperatures i.e. above 350°C. Phosphates are also added to reduce the porosity and increase the bulk density which results in reduced penetration when the ceramic body is in contact with molten metals on slags.

1. A refractory composition comprising from 70% to 96% tabular alumina, from 0% to 10% calcined alumina, from 1% to 10% milled zircon, from 3% to 10% chromic oxide refractory grains, from 0% to 18% of a phosphorus compound, from 0% to 4% bentonite and from 0% to 10% water, in which the particle size of the chromic oxide refractory grains is −10 mesh with at least 70% of the particles being +200 mesh, all of the percentages expressed on a weight basis.

2. Composition according to claim 1 in which the tabular alumina is present in size from −¼ in. through −325 mesh, wherein from 65% to 94% of the alumina is from −¼ in. to +325 mesh, the remainder of the tabular alumina being −325 mesh.

3. Composition according to claim 1 in which from ¼ to all of the −325 mesh alumina is present as tabular alumina, the remainder being calcined alumina.

4. Composition according to claim 1 in which the size of the particles of the calcined alumina and the zircon are −325 mesh.

5. Composition according to claim 1 in which the phosphorus compound employed is selected from the group consisting of phosphoric acid and aluminum phosphate.

6. A refractory composition comprising from 70% to 96% tabular alumina, from 0% to 10% calcined alumina, from 1% to 10% milled zircon and from 3% to 10% chromic oxide refractory grains, in which the particle size of the chromic oxide refractory grains is −10 mesh with at least 70% of the particles being +200 mesh, all of the percentages expressed on a weight basis.

7. Process for producing a refractory composition which comprises admixing tabular alumina in amount from 70–96%, calcined alumina in amount from 0% to 10%, milled zircon in amount from 1% to 10%, chromic oxide refractory grains ground to −10 mesh with at least 70% +200 mesh in amount from 3–10%, the percentages expressed on a weight basis, forming the mixture and firing the formed mixture at a temperature from 1400° to 1750°C. for 2 to 8 hours to form the refractory composition.

8. Process for producing a refractory composition which comprises admixing tabular alumina in amount from 70–96%, calcined alumina in amount from 0% to 10%, milled zircon in amount from 1% to 10%, chromic oxide refractory grains (ground to −10 mesh with at least 70% +200 mesh) in amount from 3–10%, phosphorus compound in amount from 1% to 18%, the percentages expressed on a weight basis, forming the mixture and firing the formed mixture at a temperature from 350° to 1750°C. for 2 to 8 hours to form the refractory composition.

9. Process for producing a plastic mixture which comprises admixing tabular alumina in amount from 70–96%, calcined alumina in amount from 0% to 10%, milled zircon in amount from 1% to 10%, chromic oxide refractory grains (ground to −10 mesh with at least 70% +200 mesh) in amount from 3–10%, phosphorus compound in amount from 1% to 18% and bentonite in amount from 1% to 4%, the percentages expressed on a weight basis.

* * * * *